United States Patent Office 3,331,852
Patented July 18, 1967

3,331,852
1,2-DIALKYL-6-HYDROXY-INDAZOLIUM SALTS
Robert Frederic Michel Sureau, Enghien-les-Bains, and Victor Marie Dupre, Louvres, France, assignors to Etablissements Kuhlmann, Paris, France
No Drawing. Filed Apr. 20, 1964, Ser. No. 361,266
Claims priority, application France, Apr. 25, 1963, 932,595
5 Claims. (Cl. 260—310)

The present invention concerns new intermediates for dyestuffs and process for the preparation of dyestuffs derived therefrom. In particular it relates to new dyestuff intermediates comprising 1,2 - dialkyl - 6 - hydroxy-indazolium salts of the general formula:

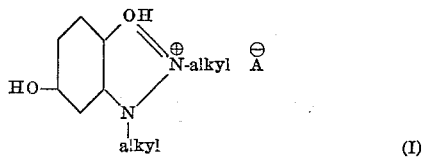

(I)

in which A represents an anion and each alkyl group contains up to 2 atoms of carbon.

The products of Formula I can be obtained with excellent yields by the hydrolysis, in dilute sulphuric acid medium at 180–190° C., of the corresponding 6-amino-1,2-dialkyl-indazolium salts. They possess the property of coupling easily with diazo derivatives so that they can be used advantageously for the preparation of dyestuffs of the general formula:

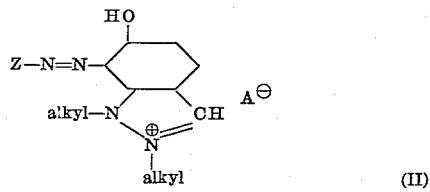

(II)

in which Z represents the residue of a diazotisable primary aromatic or heterocyclic amine, possibly substituted by nonsolubilising substituents such as halogen atoms, nitro, acylamino, alkyl, alkoxy, alkoxycarbonyl, arylamino, mono- or di-alkylamino, sulphonamido, mono- or di-alkyl-sulphonamido, arylsulphonamido, carbonamido, alkylsulphonyl, cyano, fluorosulphonyl, trifluoromethyl, phenoxy or phenoxysulphonyl groups. A represents a monovalent anion or its equivalent, and in which the alkyl groups attached to the nitrogen atom of the heterocyclic ring may be the same or different.

The dyestuffs of Formula II above are included in the general definition given in U.S. Patent No. 3,121,710, which describes a method of preparation consisting in reacting, in an organic solvent, an alkyl halide, sulphate or arylsulphonate with a dyestuff represented by the following general formula:

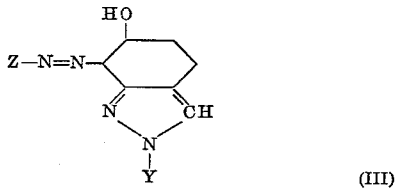

(III)

in which Z has the same significance as in Formula I and Y represents a hydrogen atom or an alkyl group.

Nevertheless, depending upon the nature of the substituents of the group Z, this process is not always easy to carry out, since the solubility of the corresponding dyestuffs of Formula II in the usual solvents may be poor, or the production of the quaternary compound impossible to carry out completely, leading to heterogeneous products which it is difficult to purify.

It has now been found that dyestuffs which have not been obtained by the process of the above-numbered patent can be successfully prepared by means of the present invention. Dyestuffs of Formula II can be prepared by a quite general method and in an excellent state of purity of coupling, in aqueous solution, the diazo derivative of an amine of the formula Z—$NH_2$, Z having the significance indicated above, with a 1,2-dialkyl-6-hydroxy-indazolium salt of Formula I. This coupling process may be effected at very different pH values, for example from 4 to 10, according to the coupling energy of the diazo compound used. When the starting material is a weak diazo compound, the coupling process is advantageously carried out in the presence of a base of the pyridine series. The dyestuff formed separates as a well crystallised salt but is sometimes partly hydrolysed. It is then advisable to make the medium again distinctly acid, for example between pH 3 and pH 4, by means of mineral acid $A^\ominus H^\oplus$ and to finish the precipitation of the salt of the dyestuff by addition, for example, of a salt $A^\ominus Na^\oplus$.

The 6-hydroxy-indazolium salts of Formula I possess an excellent coupling power; this property could not have been foreseen by reason of the strongly electro-negative character of the quaternary nitrogen.

The invention is illustrated by, but is not limited to, the following examples in which parts are parts by weight unless the contrary is indicated.

*Example 1.*—A quantity of 1,2-dimethyl-6-amino-indazolium chloride corresponding to 60 parts of 100% product is mixed with 500 parts of water and 90 parts of 66° Bé. sulphuric acid. The mixture is heated at 180° C. for 5 hours. After cooling, any impurities are filtered off and to the filtrate is added the washings from the autoclave and the filter, and then 180 parts of sodium chloride.

1,2-dimethyl-6 - hydroxy - indazolium chloride is deposited in the form of sandy crystals. It is filtered, washed with water that is saturated with sodium chloride, drained and dried at 100° C. 59 to 61 parts of product titrating about 94% are obained.

For its analysis, it is recrystallised from boiling water.
Calculated for $C_9H_{11}ON_2Cl$, percent: C, 54.40; H, 5.54; N, 14.12; Cl, 17.88. Found percent: C, 54.2, 54.5; H, 5.85, 5.75; N, 14.1, 14.3; Cl, 18.2.

*Example 2.*—3.2 parts of p-chloraniline are dissolved in 75 parts of hot water and 7.5 parts by volume of 10 N hydrochloric acid. The solution is coiled to between 0° C. and 5° C. and diazetised by the addition of 12.5 parts by volume of a 2 N solution of sodium nitrite. It is stirred for 20 minutes, filtered, and the diazo compound is introduced into a solution of 5.5 parts of 94% 1,2-dimethyl-6-hydroxy-indazolium chloride in 50 parts of water containing 7 parts of crystalline sodium acetate. The dyestuff begins to crystallise rapidly. The coupling is finished by gradually introducing ammonia until the pH is above 7. The pH is then brought back to 3–4 by the addition of hydrochloric acid, the reaction mixture is kept at 60° C. for some moments, allowed to cool, 15 parts of sodium chloride are added and the mixture filtered. The well crystallised dyestuff is collected as chloride, rinsed with a 10% solution of sodium chloride and dried in an oven. Dry weight, 9.5 parts. This dyestuff is soluble in water, and it dyes fibres based on polymers and copolymers of acrylonitrile a bright golden yellow shade having excellent general fastness, especially to light. Analysis of the dyestuff recrystallised from boiling water:

Calculated for $C_{15}H_{14}ON_4Cl_2$, $H_2O$, percent: C, 50.70; H, 4.51; N, 15.77; Cl, 20,00. Found percent: C, 50.3, 50.2; H, 4.98, 4.83; N, 15.9, 15.9; Cl, 21.0.

*Example 3.*—12.1 parts of m-xylidine are dissolved in 200 parts of water and 25 parts by volume of 10 N hydrochloric acid, the solution is cooled to 0° C., and diazotised by the addition of 50 parts by volume of a 2 N solution of sodium nitrite. The temperature is maintained at 0° C. to 5° C. for half an hour. The diazo derivative is introduced into a solution of 22.5 parts of 94% 1,2-dimethyl-6-hydroxy-indazolium chloride in 200 parts of water containing 2.5 parts of pyridine.

The pH of the mixture is taken to 7.5 to 8 by the slow addition of ammonia, then it is stirred for 12 hours, salted out at 20% by means of sodium chloride, and the dyestuff obtained filtered off, drained and dried in an oven. Dry weight, 18 parts. This dyestuff dyes fibers based on polymers and copolymers of acrylonitrile a full-bodied orange shade, endowed with very good general fastness.

The following table summarises a number of other examples according to the present invention, the coupling compound being 1,2-dimethyl-6-hydroxy-indazolium chloride.

| Ex. | Z—NH$_2$ | Shade on acrylic fibres |
|---|---|---|
| 4 | Aniline | Golden yellow. |
| 5 | 2-chloro-aniline | Do. |
| 6 | 3-chloro-aniline | Do. |
| 7 | 2-nitro-aniline | Orange yellow. |
| 8 | 3-nitro-aniline | Lemon yellow. |
| 9 | 4-nirto-aniline | Golden yellow. |
| 9 | 4-nirto-aniline | Do. |
| 10 | 4-bromo-aniline | Do. |
| 11 | 2-methyl-aniline | Do. |
| 12 | 3-methyl-aniline | Do. |
| 13 | 4-methyl-aniline | Orange gold. |
| 14 | 2-methoxy-aniline | Orange. |
| 15 | 3-methoxy-aniline | Orange gold. |
| 16 | 4-methoxy-aniline | Orange. |
| 17 | 4-cyano-aniline | Golden yellow. |
| 18 | 4-methoxycarbonyl-aniline | Orange gold. |
| 19 | 3-trifluoromethyl-aniline | Yellow. |
| 20 | 4-fluorosulphonyl-aniline | Golden yellow. |
| 21 | 2-phenoxy-aniline | Orange. |
| 22 | 4-phenoxy-aniline | Do. |
| 23 | 4-phenoxysulphonyl-aniline | Golden yellow. |
| 24 | 3-sulphonamido-aniline | Yellow. |
| 25 | 4-sulphonamido-aniline | Do. |
| 26 | 4-phenylsulphonamido-aniline | Golden yellow. |
| 27 | 4-isopropylsulphonamido-aniline | Do. |
| 28 | 4-diethylsulphonamido-aniline | Do. |
| 29 | 4-phenylamino-aniline | Garnet red. |
| 30 | 2,5-dichloro-aniline | Bright golden yellow. |
| 31 | 3,4-dichloro-aniline | Do. |
| 32 | 2,4-dimethoxy-aniline | Scarlet. |
| 33 | 2,5-dimethoxy-aniline | Brownish red. |
| 34 | 2,5-diethoxy-aniline | Bordeaux. |
| 35 | 4-nitro-2,5-dimethoxy-aniline | Scarlet. |
| 36 | 2,4,6-trimethyl-aniline | Orange. |
| 37 | 2,5-dimethyl-aniline | Do. |
| 38 | 2-methoxy-5-methyl-aniline | Reddish Orange. |
| 39 | 2-methxoy-5-carbonamido-aniline | Orange. |
| 40 | 2-methoxy-5-diethylsulphonamido-aniline | Orange gold. |
| 41 | 2-methoxy-4-nitro-aniline | Orange. |
| 42 | 2-methoxy-5-nitro-aniline | Orange yellow. |
| 43 | 4-methoxy-2-nitro-aniline | Vermillion. |
| 44 | 2-methoxy-5-chloro-aniline | Orange. |
| 45 | 2-methyl-5-chloro-aniline | Bright orange yellow. |
| 46 | 2-methyl-4-chloro-aniline | Orange gold. |
| 47 | 2-methyl-5-nitro-aniline | Orange yellow. |
| 48 | 4-methyl-2-nitro-aniline | Bright orange. |
| 49 | 2-methyl-4-nitro-aniline | Orange yellow. |
| 50 | 2-methyl-5-dimethylsulphonamido-aniline | Golden yellow. |
| 51 | 2,5-dimethoxy-4-benzoylamino-aniline | Bordeaux. |

We claim:

1. Compounds of the formula:

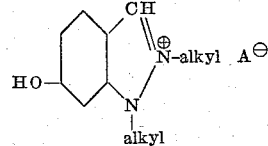

in which A represents an anion and each alkyl group contains up to 2 atoms of carbon.

2. Compounds according to claim 1 wherein the alkyl groups are identical.

3. Compounds according to claim 1 wherein the alkyl groups are different from each other.

4. Compounds according to claim 1 wherein each alkyl group is a methyl group.

5. Compounds according to claim 1 wherein $A^\ominus$ represents a halide ion.

References Cited

UNITED STATES PATENTS

| | | | |
|---|---|---|---|
| 2,282,323 | 5/1942 | Dickey et al. | 260—157 |
| 2,645,642 | 7/1953 | Adams et al. | 260—310 |
| 2,787,515 | 4/1957 | Sureau et al. | 260—299 X |
| 2,828,301 | 3/1958 | Sureau et al. | 260—157 X |

FOREIGN PATENTS 1,211,082  10/1959  France.

OTHER REFERENCES

Auwers, Ber. Deut. Chem., vol. 58, pp. 1360–1369 (1925).

CHARLES B. PARKER, *Primary Examiner.*

F. D. HIGEL, *Assistant Examiner.*